Dec. 3, 1935.    R. C. CORDERMAN    2,022,758
GROUND DETECTING ARRANGEMENT
Filed June 25, 1931

INVENTOR
R. C. Corderman
BY
ATTORNEY

Patented Dec. 3, 1935

2,022,758

UNITED STATES PATENT OFFICE 2,022,758

GROUND DETECTING ARRANGEMENT

Roy C. Corderman, Chevy Chase, Md., assignor to American Telephone and Telegraph Company, a corporation of New York Application June 25, 1931, Serial No. 546,882

3 Claims. (Cl. 177—311)

This invention relates to rectifying and detecting systems as well as to testing systems. More particularly this invention relates to arrangements for determining and indicating the presence of a grounded condition on one of the conductors of an electric circuit.

One of the difficulties encountered in circuits transmitting alternating or other current is caused by the accidental grounding of one of the circuit conductors. Such a condition frequently reduces the quality of transmission and this is especially true of circuits employed in telephony for the transmission of speech or ringing currents.

One of the objects of this invention is to provide arrangements for quickly determining and indicating whether one of the conductors of a line has become partially or completely grounded or whether the line has become otherwise unbalanced.

Figure 1:
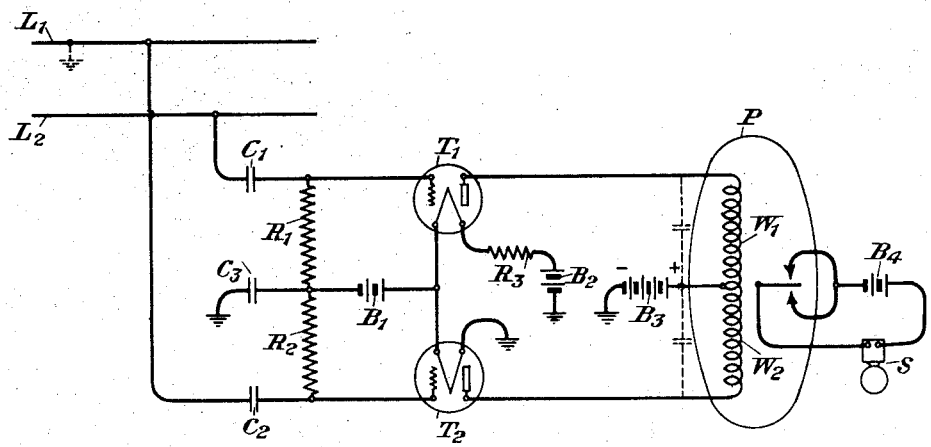
Figure 2:
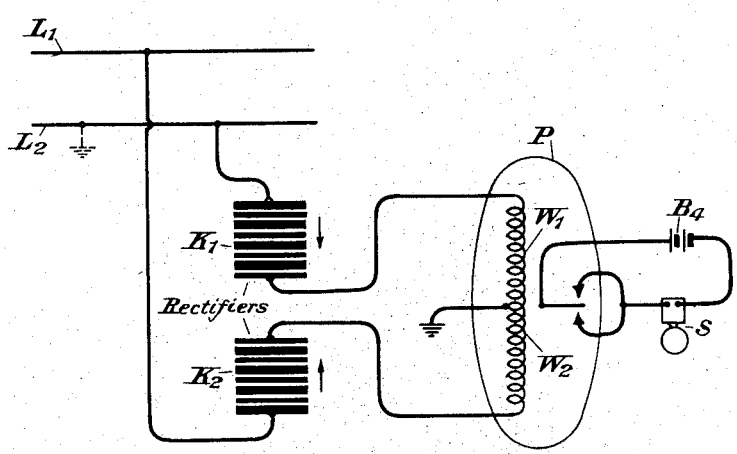

This invention will be better understood from the detailed description hereinafter following when read in connection with the accompanying drawing of which Figures 1 and 2 represent two embodiments of the invention.

Referring to Fig. 1 of the drawing, reference characters $L_1$ and $L_2$ represent the conductors of a line suitable to transmit alternating current of any frequency as, for example, 135 cycles. The line may be one used in telephony and may also, if desired, transmit speech currents or carrier currents or currents employed for ringing purposes. The line formed by conductors $L_1$ and $L_2$ is normally ungrounded and the apparatus connected thereto will be used to determine the presence of a ground on either of its conductors, as will be apparent from the detailed description hereinafter following.

The conductors $L_1$ and $L_2$ are bridged by a balanced network which includes two equal condensers $C_1$ and $C_2$ and two equal impedances $R_1$ and $R_2$ which may preferably be resistances, as shown, all of which are connected in series relationship. The terminal common to resistances $R_1$ and $R_2$ is connected to ground through a condenser $C_3$.

The reference character $T_1$ and $T_2$ represent two three-element vacuum tubes which may be used in this invention as detectors or rectifiers. The resistance $R_1$ is connected between the grid and filament electrodes of tube $T_1$ through a battery $B_1$ and the resistance $R_2$ is connected between the filament and grid electrodes of the tube $T_2$ through the same battery $B_1$. The battery $B_1$ is common to the grid electrodes of tubes $T_1$ and $T_2$ and its potential and polarity are such as to insure the proper functioning of these tubes as detectors or rectifiers.

The filaments of the tubes $T_1$ and $T_2$ are connected in series with each other as well as in series with the resistance $R_3$ and a battery $B_2$. The battery $B_2$ supplies the current required to properly heat these filaments to suitable electron emitting temperatures, and the resistance $R_3$ may be employed as a rheostat to control the flow of current through these filaments.

The plate electrodes of tubes $T_1$ and $T_2$ are connected to each other through the windings $W_1$ and $W_2$ of the relay P. The device P may be a polar relay or, if desired, any form of neutral relay well known in the art. The positive terminal of a battery $B_3$ is connected to the junction of windings $W_1$ and $W_2$ of relay P and the negative terminal of battery $B_3$ is grounded. Battery $B_3$ supplies equal positive potentials to the plate electrodes of tubes $T_1$ and $T_2$ and substantially equal currents normally flow through the circuits formed by the plate and filament electrodes of tubes $T_1$ and $T_2$.

Under normal conditions, the armature of relay P is in its mid position and it is free from its associated contacts. Both of these contacts are tied together and they are connected in series with an alarm circuit which may include a battery $B_4$ and a bell or sounder S. Obviously, any other well known form of alarm circuit may be used in the practice of this invention and it may include other forms of audible devices or visual devices, or both.

The grid electrodes of tubes $T_1$ and $T_2$ are equally biased by the battery $B_1$ to such an extent that no currents, or negligibly small equal currents, flow through the windings $W_1$ and $W_2$ of the relay P. When the conductors $L_1$ and $L_2$ are ungrounded, a small alternating current flows through the series circuit formed by the condenser $C_1$ resistances $R_1$ and $R_2$ and the condenser $C_2$ thereby impressing equal alternating voltages on the grids of the vacuum tubes $T_1$ and $T_2$. The average plate currents are thereby increased, but remain equal to each other so that the armature of the relay P will stay in its neutral position and no current will flow through the bell or sounder S. To avoid vibrations due to the pulsations of the plate current, the armature of the relay P may be made relatively heavy or, if desired equal condensers may be bridged across the windings $W_1$ and $W_2$, as shown in dotted lines.

When one of the conductors $L_1$ or $L_2$ becomes partially or completely grounded, a very different condition will arise. Let it be assumed that the conductor $L_1$ is so grounded, as shown in dotted lines. Then the condenser $C_2$, resistances $R_2$ and condenser $C_3$ will form a local circuit which is grounded at both ends and practically no voltage will be impressed across the terminals of the resistance $R_2$. At the same time, an increased current will flow over the circuit including the conductor $L_2$, the condenser $C_1$, resistance $R_1$, condenser $C_3$ and ground. This current will provide an increased potential across the terminals of the resistance $R_1$ which will substantially increase the current which flows from battery $B_3$ through the winding $W_1$ of the relay P. The armature of relay P, being controlled by the greater of the currents flowing through the windings $W_1$ and $W_2$, will close one of its contacts and current will promptly flow from battery $B_4$ through bell or sounder S.

Any midpoint ground on an element connected to conductors $L_1$ and $L_2$ will not unbalance the circuit formed by condenser $C_1$, resistances $R_1$ and $R_2$ and condenser $C_2$ which bridges these conductors and will therefore, not operate the alarm circuit.

Fig. 2 shows the circuit formed by conductors $L_1$ and $L_2$ bridged by two oppositely poled rectifiers $K_1$ and $K_2$ which are connected in series with each other and with the windings $W_1$ and $W_2$ of the polar or neutral relay P, the junction common to these windings being grounded. Each of these rectifiers may consist of a plurality of units, each including two electrodes, one formed by a metallic element, such as copper, in physical contact with another element, such as the oxide of copper. Each rectifying unit will present good conductivity when poled in one direction and poor conductivity when poled in the opposite direction. Such a unit is sold commercially under the name of "Rectox". The group of units forming each of the rectifiers $K_1$ or $K_2$ will freely transmit current in the direction indicated by the adjacent arrows, the respective currents neutralizing each other when the rectifiers are poled in opposite directions, as is the case in this invention.

Inasmuch as the rectifiers $K_1$ and $K_2$ are oppositely poled, practically no current or very small currents will flow through these rectifiers and through the windings $W_1$ and $W_2$ of relay P, if neither of the conductors $L_1$ or $L_2$ is grounded. The normal current circulating through these rectifiers may be reduced to any desired extent merely by increasing the number of component units. However, upon the grounding of one of the conductors such as $L_2$, as shown in dotted lines, practically no current will flow through the rectifier $K_1$ and through the winding $W_1$ and, moreover, a large current will flow through the rectifier $K_2$ and the winding $W_2$ to ground. Since the armature of the polar or neutral relay P is controlled by the greater of the currents flowing through the winding $W_1$ and $W_2$, it will be moved to close one of its associated contacts and this will cause the battery $B_4$ to send current through the ringer or sounder S. It will be apparent, of course, that any unbalanced grounded element connected to the line formed by conductors $L_1$ and $L_2$ will similarly operate the relay P and render the sounder S audible.

While this invention has been shown and described in certain particular embodiments merely for the purpose of illustration, it will be understood that the general principles of this invention may be applied to other and widely varied organizations without departing from the spirit of the invention and the scope of the appended claims.

What is claimed is:

1. The combination of a two-wire telephone circuit, two equal resistances capacitively connected in series relationship with each other across said circuit so that no direct current normally flows therethrough, two rectifiers, each of said rectifiers being connected to one of said resistances, a normally unoperated polar relay having two windings and an armature which is normally unbiased from its contacts, each of the windings of said relay being connected respectively to said rectifiers, and an alarm circuit controlled by the armature of said relay and operated when said armature becomes biased to one of its contacts.

2. Apparatus for determining that one of the wires of a two-wire telephone circuit has become grounded, comprising a normally unoperated polar relay having two windings and an armature which is normally unbiased from its contacts, two rectifiers coupled respectively to said windings, and a pair of impedances capacitively connected in series with each other and across said telephone circuit so that no direct current normally flows therethrough, said impedances being coupled respectively to said rectifiers, the terminal common to said impedances being grounded.

3. The combination of a two-wire telephone line, two equal resistances, two condensers connected in series with said resistances across said line so that no current normally flows through said resistances, a third condenser connected between the terminal common to said resistances and ground, two vacuum tube rectifiers each having grid, filament and plate electrodes, each resistance being connected respectively to the grid and filament electrodes of said vacuum tube rectifiers, a normally unoperated polar relay having two windings and an armature which is unbiased from its contact, a source of direct current potential, each winding of the polar relay being connected respectively to the plate and filament electrodes of said vacuum tube rectifiers through the source of direct current potential, and an alarm circuit controlled by the armature of the polar relay and operated when said armature becomes biased to one of its contacts.

ROY C. CORDERMAN.